Figure 1:
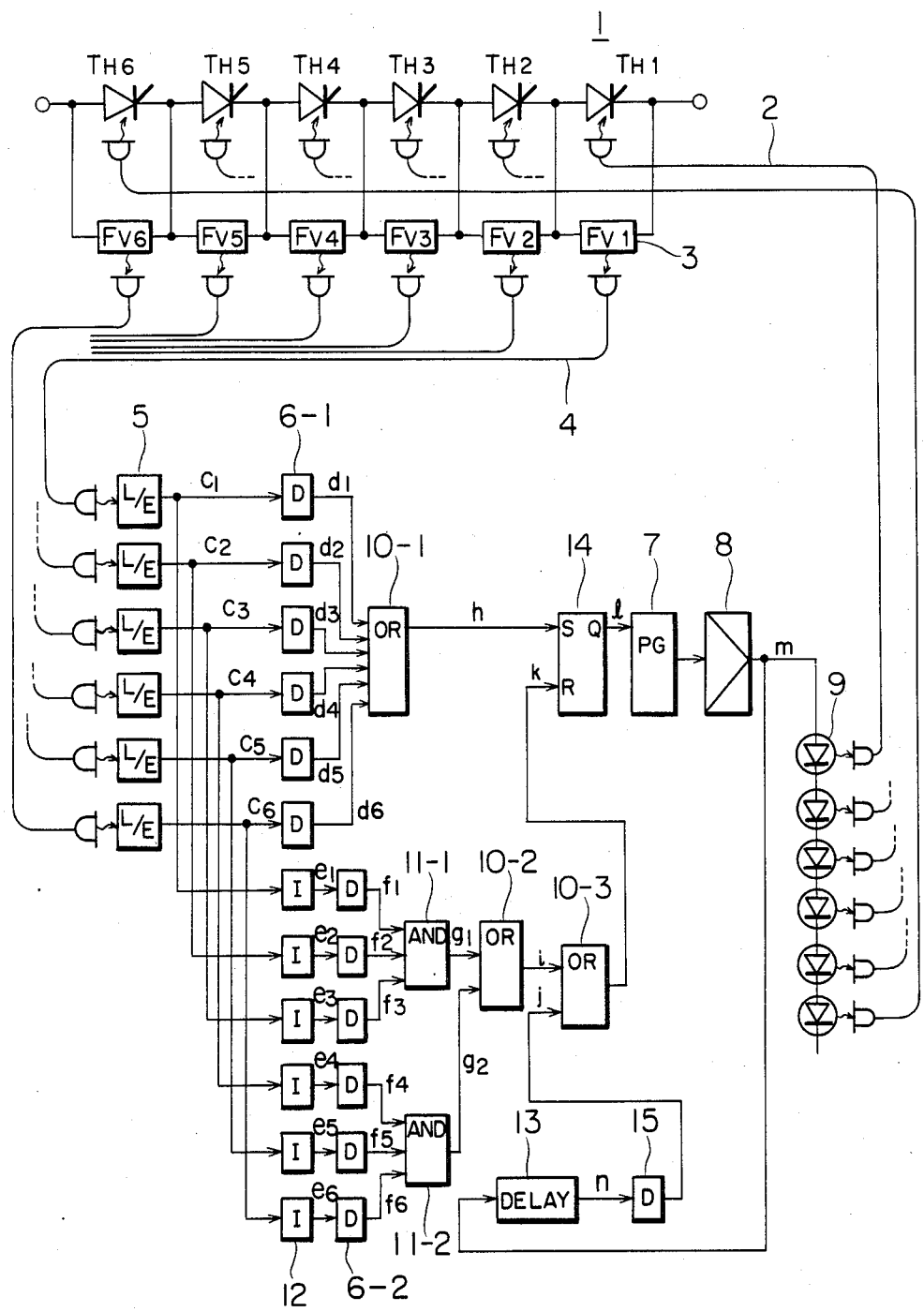

United States Patent [19]

Ito

[11] Patent Number: 4,621,314

[45] Date of Patent: Nov. 4, 1986

[54] THYRISTOR CONVERTER CONTROL APPARATUS INCLUDING DIFFERENTIATION ARRANGEMENT TO PREVENT ABNORMAL OPERATION

[75] Inventor: Takashi Ito, Hitachi, Japan

[73] Assignee: Hitachi, Ltd., Tokyo, Japan

[21] Appl. No.: 631,817

[22] Filed: Jul. 17, 1984

[30] Foreign Application Priority Data

May 30, 1984 [JP] Japan .................................. 59-108393

[51] Int. Cl.⁴ ........................ H02H 7/12; H02M 1/092
[52] U.S. Cl. .................................. 363/54; 307/252 L; 363/57; 363/68
[58] Field of Search ............... 363/54, 57, 68; 361/90; 307/252 L, 252 Q

[56] References Cited

U.S. PATENT DOCUMENTS

| 3,881,147 | 4/1975 | Ueda et al. | 363/57 |
| 4,084,206 | 4/1978 | Leowald et al. | 363/57 |
| 4,527,227 | 7/1985 | Koseki | 363/54 |

FOREIGN PATENT DOCUMENTS

| 88872 | 6/1982 | Japan | 363/54 |
| 88873 | 6/1982 | Japan | 363/54 |

Primary Examiner—William H. Beha, Jr.
Attorney, Agent, or Firm—Antonelli, Terry & Wands

[57] ABSTRACT

An apparatus for controlling a thyristor converter includes a plurality of voltage detectors provided for individual series-connected thyristors respectively for detecting the presence or absence of voltage applied to the thyristors, and elements for generating a thyristor triggering pulse signal representative of the logical sum of the voltage presence-absence signals from the voltage detectors and a triggering command signal commanding the desired triggering phase and on-period of the thyristor converter. The apparatus comprises a plurality of differentiation circuits differentiating the output signals of the plural voltage detectors respectively, and a signal synthesis circuit synthesizing the output signals of the differentiation circuits to generate an output signal indicative of the voltage presence or absence. By virtue of the above construction, the thyristor converter can continuously operate without being shut down even when any one of the thyristor voltage detection signals is disabled.

11 Claims, 2 Drawing Figures

THYRISTOR CONVERTER CONTROL APPARATUS INCLUDING DIFFERENTIATION ARRANGEMENT TO PREVENT ABNORMAL OPERATION

This invention relates to an apparatus for controlling a thyristor converter, and more particularly to an apparatus of the kind above described which controls a high-voltage converter including a plurality of series-connected thyristors so that the converter can normally operate even when trouble occurs in any one of voltage detecting systems provided for the individual thyristors.

In a control apparatus controlling a high-voltage converter constructed by connecting a plurality of thyristors in series, a voltage detecting circuit for detecting a thyristor forward voltage and a thyristor reverse voltage is provided for each of the plural thyristors, and, on the basis of the detection output signals of the voltage detecting circuits and the signal relevant to the required triggering phase and on-period of the thyristor converter, the timing of applying the gate pulse signal to the thyristors is determined.

In the prior art control apparatus controlling such a high-voltage converter, it has been the common practice that the detection output signals from the voltage detecting circuits provided for the individual thyristors are applied intact to a signal synthesis OR circuit generating a single output signal indicative of the logical sum of the input signals, and, on the basis of such an output signal, the presence or absence of the forward voltage in each thyristor is judged. It is the recent tendency that light pulse triggered thyristors or photo thyristors are used to constitute the high-voltage converter, and an optical signal emitted from a light-emitting diode and guided by a light guide to be applied to an opto-electrical transducer is used for the transmission of the detection output signal from each of the voltage detection circuits. However, malfunctioning of any one of the opto-electrical transducers results in generation of an erroneous signal which is applied to the signal synthesis OR circuit. In one form of the problem, the detection output signal continues to appear without any interruption. In such a case, even if only one of the plural voltage detection circuits in the prior art control apparatus might continuously generate its output signal without interruption due to malfunctioning of the associated opto-electrical transducer, the output signal from the signal synthesis OR circuit would also appear continuously without any interruption. Consequently, the gate pulse signal will not be properly generated thereby giving rise to abnormal operation of the thyristor converter, and, in a worst case, the thyristor or thyristors will be destroyed.

In such an event, the thyristor converter must be disconnected from the power system by a protective unit to be shut down, and the continuation of the converter operation is impossible. The same applies also to the case where such a problem occurs in any one of the reverse voltage detecting systems.

It is therefore a primary object of the present invention to provide a thyristor converter control apparatus which ensures trouble-free continuous operation of the thyristor converter even in the event of appearance of an erroneous signal as described above from any one of the voltage detecting circuits provided for the plural thyristors.

The present invention which attains the above object is featured by the provision of a control apparatus for controlling a thyristor converter, including a plurality of voltage detectors provided for individual series-connected thyristors respectively for detecting the presence or absence of voltage applied to the thyristors, and elements for generating a thyristor triggering pulse signal representative of the logical sum of the voltage presence-absence signals from the voltage detectors and a triggering command signal commanding the desired triggering phase and on-period of the thyristor converter, the control apparatus comprising a plurality of differentiation circuit differentiating the output signals of the plural voltage detectors respectively, and a signal synthesis circuit synthesizing the output signals of the differentiation circuits to generate an output signal indicative of the voltage presence or absence.

Figure 2:
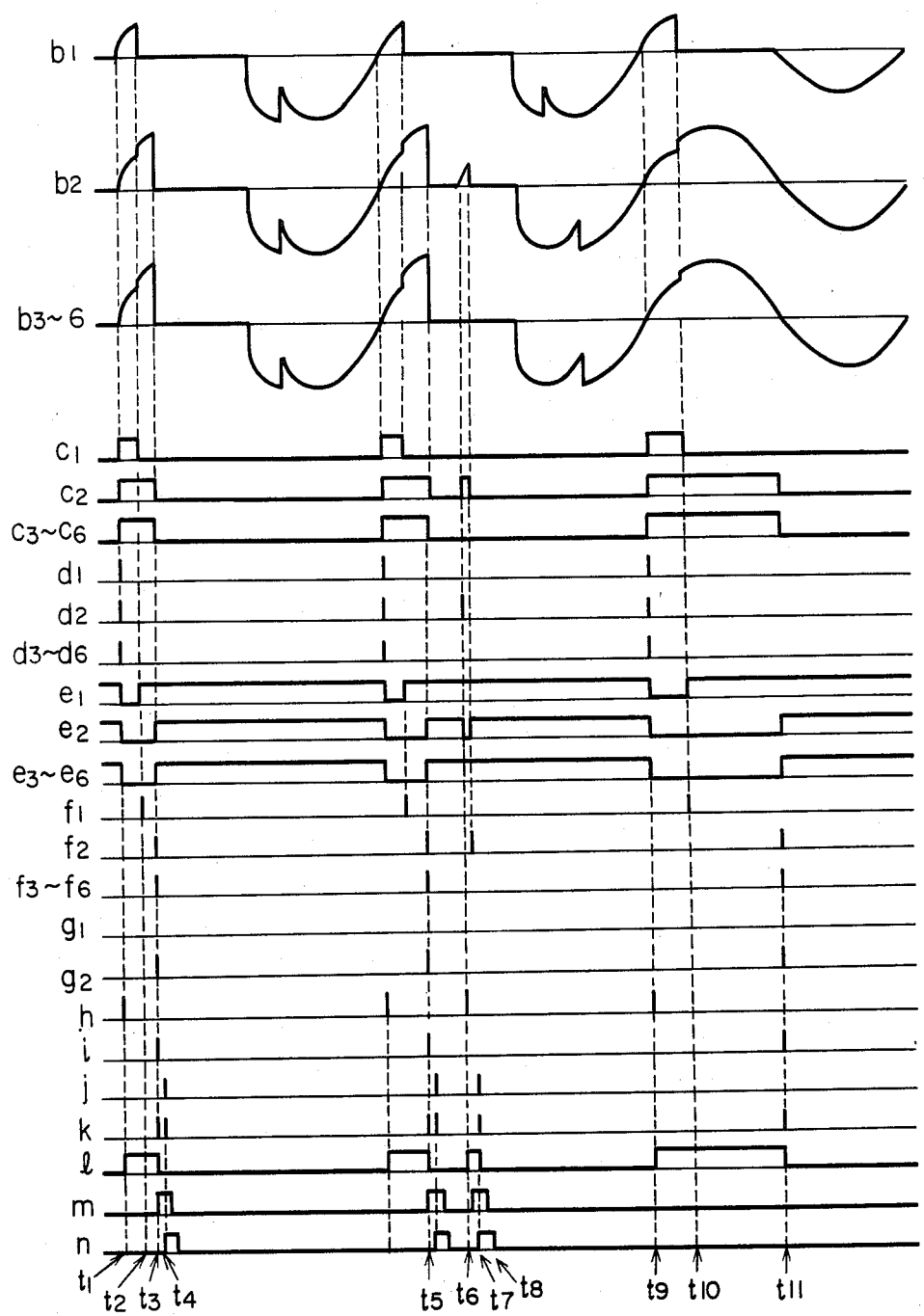

The present invention will be apparent from the following detailed description taken in conjunction with the accompanying drawings, in which:

FIG. 1 is a block diagram showing the structure of an embodiment of the thyristor converter control apparatus according to the present invention; and FIG. 2 is a waveform diagram showing operating waveforms appearing at various parts of the control apparatus of the present invention shown in FIG. 1.

Referring to FIG. 1 showing the structure of an embodiment of the thyristor converter control apparatus according to the present invention, a plurality of light pulse triggered thyristors 1 (which are designated also by symbols $TH_1$ to $TH_6$ and which will be referred to hereinafter as photo thyristors) are connected in series to constitute a thyristor converter, and a plurality of forward voltage detection circuits 3 ($FV_1$ to $FV_6$) are connected in parallel with the photo thyristors 1 respectively to detect a forward voltage applied to these photo thyristors 1. The electrical signals indicative of the detected forward voltage are converted into optical signals which are transmitted by light guides 4 to photo-electrical transducers 5 (L/E) to be converted into electrical signals $C_1$ to $C_6$ respectively.

In a prior art apparatus, these electrical signals $C_1$ to $C_6$ are applied intact to a signal synthesis OR circuit 10-1 (OR), and an output signal h representative of the logical sum of the input signals $C_1$ to $C_6$ is applied to a pulse generator 7 (PG). An on-off signal determining the triggering phase and on-period of the thyristor converter is also applied to the pulse generator 7 from a control and protective unit (not shown) provided for controlling and protecting the overall converter system. On the basis of such signals, the timing of generation of gate pulses applied to the photo thyristors 1 is determined, and a gate signal including gate pulses of predetermined pulse width is applied from the pulse generator 7 to an amplifier 8, which generates a gate pulse signal m.

According to the embodiment of the present invention, differentiation circuits 6-1 (D) are disposed in the succeeding stage of the opto-electrical transducers 5 (L/E) to differentiate the electrical signals $C_1$ to $C_6$ at their leading edges thereby generating differentiation signals $d_1$ to $d_6$ indicative of the start point of forward voltage detection respectively. These differentiation signals $d_1$ to $d_6$ are synthesized in the signal synthesis OR circuit 10-1 (OR), and the output signal h of the OR circuit 10-1 is applied to set a flip-flop 14 which, when so set, generates an output signal l indicative of the "presence" of forward voltage.

Inversion circuits 12 (I) and second differentation circuits 6-2 (D) are disposed in parallel with the first differentiation circuits 6-1 and signal synthesis OR circuit 10-1 in the succeeding stage of the opto-electrical transducers 5 (L/E). The inversion circuits 12 (I) invert the electrical signals $C_1$ to $C_6$ to provide inverted signals $e_1$ to $e_6$ respectively, and the second differentiation circuits 6-2 (D) differentiate the signals $e_1$ to $e_6$ to generate differentiation signals $f_1$ to $f_6$ indicative of the end point of forward voltage detection respectively. These signals $f_1$ to $f_6$ are divided into a plurality of or two groups. In the illustrated embodiment, the signals $f_1$, $f_2$ and $f_3$ forming one of the groups are applied to a logic circuit 11-1 which generates an AND output signal $g_1$, while the remaining signals $f_4$, $f_5$ and $f_6$ forming the other group are applied to another logic circuit 11-2 which generates an AND output signal $g_2$. These signals $g_1$ and $g_2$ are applied to a logic circuit or second OR circuit 10-2 which generates a final detection output signal i.

The gate pulse signal m from the amplifier 8 is applied to light-emitting diodes 9 which apply the gate pulses to the individual photo thyristors 1 by way of light guides 2. The gate pulse signal m from the amplifier 8 is also applied through a delay circuit 13 to a third differentation circuit 15 which generates a differentiation signal j. The flip-flop 14 is reset in the presence of either the aforementioned signal i indicative of the end point of forward voltage detection or this differentation signal j. More precisely, these signals i and j are applied to a logic circuit or third OR circuit 10-3 whose output signal k is applied to the reset terminal R of the flip-flop 14 to reset the same.

The embodiment of the present invention having a structure as described above is advantageous over the prior art apparatus from the aspect of operation. The advantages of the present invention will now be described.

When the flip-flop 14 is set by the signal h, it indicates the "presence" of forward voltage, as described already. The output signals $c_1$ to $c_6$ from the opto-electrical transducers 5 (L/E) are differentiated by the associated differentation circuits 6-1 which generate the differentation signals $d_1$ to $d_6$ respectively, and these signals $d_1$ to $d_6$ are applied to the OR circuit 10-1 which generates the signal h applied to the set terminal S of the flip-flop 14. Therefore, even if any one of the electrical signals $c_1$ to $c_6$, hence, any one of the opto-electrical transducers 5 malfunctions and, for example, the signal $c_1$ appears continuously without interruption resulting in disappearance of the signal $d_1$, the remaining signals $d_2$ to $d_6$ are necessarily applied to the signal synthesis OR circuit 10-1 to ensure generation of the signal h which sets the flip-flop 14. Also, because of the fact that the signals $d_1$ to $d_6$ are synthesized by the signal synthesis OR circuit 10-1 which generates the set signal h in response to the generation of the signal c from the first responding one of the opto-electrical transducers 5 (L/E), the protective system can effectively protect the thyristor converter in the event of partial turn-off of the photo thyristors 1 due to, for example, sudden current interruption.

The OR circuit 10-3 generating the signal k resetting the flip-flop 14 may also be arranged to be similar to the arrangement of the OR circuit 10-1 generating the signal h setting the flip-flop 14. However, the OR circuit 10-3 is arranged as described already so that the thyristor converter can be protected against damage due to malfunctioning of any one of the photo thyristors $TH_1$ to $TH_6$ during breakover and due to partial turn-off of the photo thyristors $TH_1$ to $TH_6$. This protective arrangement will be explained in detail with reference to FIG. 2.

FIG. 2 is a waveform diagram showing voltage waveforms applied to the individual photo thyristors $TH_1$ to $TH_6$ and resultant various signal waveforms appearing at the individual parts of the control apparatus.

In FIG. 2, $b_1$ designates the AK voltage waveform applied across the anode and cathode of the photo thyristor $TH_1$ shown in FIG. 1, and it will be seen that breakover occurs at time $t_2$. In FIG. 2, $b_2$ designates the AK voltage waveform of the photo thyristor $TH_2$ shown in FIG. 1. In FIG. 2, $b_3$ to $b_6$ designate the AK voltage waveforms of the photo thyristors $TH_3$ to $TH_6$ shown in FIG. 1, and the AK voltage waveform of only one of these photo thyristors $TH_3$ to $TH_6$ is illustrated on the premise that they all behave in the same way. In FIG. 2, the same symbols including the suffixes are used to designate the equivalents appearing in FIG. 1.

At time $t_1$, the forward voltage is applied to the valves, and the forward voltage detection signals $c_1$ to $c_6$ of "1" level corresponding to the AK voltage waveforms $b_1$ to $b_6$ appear from the opto-electrical transducers 5 respectively. As a result, the differentiation signals $d_1$ to $d_6$ indicative of the start point of forward voltage detection are generated from the respective differentation circuits 6-1 to be applied to the signal synthesis OR circuit 10-1. The output signal h from the OR circuit 10-1 is applied to set the flip-flop 14, and the synthesized forward voltage detection signal l of "1" level indicative of the "presence" of forward voltage appears from the flip-flop 14. Then, when the photo thyristor $TH_1$ breaks over at time $t_2$ and the AK voltage $b_1$ drops to its "0" level, the forward voltage detection signal $c_1$ turns into its "0" level from the "1" level, and its inverted signal $e_1$ of "1" level is applied to the associated differentation circuit 6-2 which generates the differentation signal $f_1$ indicative of the end point of forward voltage detection.

In the illustrated embodiment of the present invention, the AND circuit 11-1 generates its output signal $g_1$ when all of the three input signals $f_1$, $f_2$ and $f_3$ are applied thereto. Therefore, the application of the signal $f_1$ only does not produce the output signal $g_1$ of the AND circuit 11-1, and the flip-flop 14 generating the synthesized forward voltage detection signal l is not reset. That is, the flip-flop 14 is not influenced by the breakover of the photo thysistor $TH_1$. Thus, when the thyristor triggering command signal (not shown) is applied at time $t_3$ at which the synthesized forward voltage detection signal l is in its "1" level, the thyristor triggering pulse signal m is generated from the amplifier 8 so that the photo thyristors $TH_1$ to $TH_6$ can be normally triggered.

Suppose that the AND circuits 11-1 and 11-2 are not present. Then, the synthesized forward voltage detection signal l will be turned into its "0" level at time $t_2$, resulting in judgment that the forward voltage is "absent". On the other hand, the thyristor triggering pulse signal m is normally generated when both of the forward voltage and the thyristor triggering command signal are judged to be "present", that is, when the AND condition for these signals is satisfied. However, at time $t_3$ at which the thyristor triggering command signal is applied, the synthesized forward voltage detection signal l will be in its "0" level indicative of the "absence" of forward voltage in such a case regardless of the fact that the AK voltages $b_2$ and $b_3$ are actually applied to the respective valves $TH_2$ and $TH_3$, that is, the forward voltage, "is present". Consequently, the thyristor triggering pulse signal m will not be generated, and the photo thyristors $TH_2$ and $TH_3$ will be placed in a gate-blocked state without being turned on, resulting in impossibility of continuous operation of the thyristor converter.

In addition to the provision of the AND circuits 11-1 and 11-2, the delay circuit 13, differentiation circuit 15 and OR circuit 10-3 are also provided in the embodiment of the present invention for resetting the flip-flop 14 thereby inhibiting generation of the signal l under the condition that the thyristor triggering command signal 15 is applied. The provision of such circuits is based on the fact that, since the logic of the triggering system is such that the thyristor triggering pulse signal m is generated under the condition of the "presence" of forward voltage, the photo thyristors are necessarily turned on in response to the appearance of the triggering pulse signal m and the thyristor forward voltage drops necessarily to the "0" level. In the normal turn-on mode, the thyristor triggering pulse signal m generated at time $t_3$ is delayed by a predetermined delay time by the delay circuit 13 to provide the delayed signal n, and this signal n is differentiated by the differentiation circuit 15 to obtain the signal j which is applied through the OR circuit 10-3 to the reset terminal R of the flip-flop 14 so as to reliably reset the flip-flop 14.

The circuits 13, 15 and 10-3 exhibit the effect especially when partial turn-off of the photo thyristors $TH_1$ to $TH_6$ occurs. Suppose now that, after the photo thyristors have been normally turned on at time $t_5$, partial turn-off of the photo thyristor $TH_2$ alone occurs at time $t_6$ due to, for example, accidental current interruption.

In such a case, forward voltage appears in the AK voltage waveform $b_2$ of the photo thyristor $TH_2$, and the forward voltage detection signal $c_2$ of "1" level appears at time $t_6$ to cause generation of the corresponding differentiation signal $d_2$ indicative of the start point of forward voltage detection. Since the set signal h setting the flip-flop 14 is generated from the OR circuit 10-1 to which the signals $d_1$ to $d_6$ are connected, the signal h is generated in response to the application of the signal $d_2$ above described, and the synthesized forward voltage detection signal l of "1" level is generated to generate the thyristor triggering pulse signal m tending to re-trigger the photo thyristor $TH_2$. In response to the application of this re-triggering pulse signal m, the AK voltage $b_2$ of the photo thyristor $TH_2$ drops to its "0" level again, and, in response to the appearance of the forward voltage detection signal $c_2$ of "0" level, the differentiation signal $f_2$ indicative of the end point of forward voltage detection is applied to the AND circuit 11-1. However, the AND circuit 11-1 does not generate the flip-flop reset signal $g_1$ since the other input signals $f_1$ and $f_3$ are not applied, thereto. Even in such a case, however, the reset signal k resetting the flip-flop 14 is provided by the differentiation signal j obtained by differentiating the signal n obtained by delaying the triggering pulse signal m by the predetermined delay time. Consequently, the synthesized forward voltage detection signal l turns into its "0" level to restore the normal operating condition.

It will be understood from the foregoing detailed description that the present invention provides an apparatus for controlling a thyristor converter including a plurality of thyristors so that the thyristor converter can continuously operate without being shut down even when any one of the thyristor voltage detection signals is disabled.

I claim:

1. An apparatus for controlling a thyristor converter including a plurality of series-connected thyristors comprising:
    a plurality of voltage detectors for detecting the presence or absence of voltage applied to said thyristors respectively;
    a plurality of differentiation means for differentiating the output signals from said voltage detectors respectively;
    signal synthesis means for synthesizing the output signals from said differentiation means by logically combining said output signals, and for judging the presence or absence of the voltage applied to said thyristors based on said output signals from said differentiation means; and
    trigger pulse generating means for generating pulses to trigger said thyristors in response to a judgment by the signal synthesis circuit of the presence of the voltage applied to said thyristors.

2. A thyristor converter control apparatus as claimed in claim 1, wherein said plural differentiation means include first differentiation means generating output signals indicative of the start point of voltage detection under the condition of the presence of the voltage and second differentiation means generating output signals indicative of the end point of voltage detection under the condition of the presence of the voltage, and said signal synthesis means generate a synthesized signal indicative of the presence of the voltage in response to the appearance of an output signal from any one of said first differentiation means or indicative of the absence of the voltage in response to the appearance of at least two output signals from said second differentiation means.

3. An apparatus for controlling a thyristor converter including a plurality of series-connected thyristors, comprising:
    a plurality of voltage detectors for detecting the presence or absence of voltage applied to said thyristors respectively;
    a plurality of first differentiation means for generating output signals indicative of the start point of voltage detection under the condition of the presence of the voltage;
    a plurality of second differentiation means generating output signals indicative of the end point of voltage detection under the condition of the presence of the voltage;
    triggering pulse detecting means for detecting a triggering pulse signal triggering said thyristors; and
    signal synthesis means for generating a synthesized signal indicative of the presence of the voltage in response to the appearance of an output signal from any one of said first differentiation means or indicative of the absence of the voltage in response to the appearance of at least two output signals from said second differentiation means or an output signal from said triggering pulse detecting means.

4. A thyristor converter control apparatus as claimed in claim 1, wherein said voltage detectors and said differentiation means are connected to one another through voltage converters for converting electrical signal generated by said voltage detectors indicative of the presence or absence of voltage applied to the thyristors into optical signals and photo-electrical transducers for converting said optical signals into electrical signals.

5. A thyristor converter control apparatus as claimed in claim 3, wherein said voltage detectors and said first and second differentiation means are connected to one another through voltage converters for converting electrical signals generated by said voltage detectors indicative of the presence or absence of voltage applied to the thyristors into optical signals and photo-electrical transducers for converting said optical signals into electrical signals.

6. A thyristor converter control apparatus including a plurality of series-connected thyristors comprising:
   a plurality of voltage detectors for detecting the presence or absence of voltage applied to said thyristors respectively;
   a plurality of differentiation means for differentiating the output signals from said voltage detectors respectively;
   signal synthesis means for synthesizing the output signals from said differentiation means and for judging the presence or absence of the voltage applied to said thyristors; and
   trigger pulse generating means for generating pulses to trigger said thyristors in response to a judgment by the signal synthesis circuit of the presence of the voltage applied to said thyristors,
   wherein said plural differentiation means includes first differentiation means generating output signals indicative of the start point of voltage detection under the condition of the presence of the voltage and second differentiation means generating output signals indicative of the end point of voltage detection under the condition of the presence of the voltage, and said signal synthesis means generate a synthesized signal indicative of the presence of the voltage in response to the appearance of an output signal from any one of said first differentiation means or indicative of the absence of the voltage in response to the appearance of at least two output signals from said second differentiation means.

7. An apparatus for preventing abnormal operation of a system having a plurality of series-connected thyristors and having a control system for triggering the thyristors including a plurality of voltage detectors for detecting the presence or absence of a forward voltage being applied to the thyristors and a triggering circuit for generating a triggering pulse based on an output of said plurality of voltage detectors indicating the presence of a forward voltage, said apparatus for preventing abnormal operation comprising:
   a plurality of first differentiation means for differentiating output signals of said voltage detectors, respectively, to provide an indication of the start of forward voltage being applied to said thyristors;
   means for logically combining outputs of said plurality of first differentiation means;
   means for generating a forward voltage detection signal based on an output of said logical combination means; and
   means for generating said triggering signal for said thyristors in accordance with the forward voltage detection signal,
   wherein said plurality of first differentiation means prevents a continuous generation of a triggering signal in the event of a malfunction which provides an erroneous continuous indication of a forward voltage of a thyristor to one of said plurality of first differentiation means.

8. An apparatus according to claim 7, wherein said means for logically combining outputs of the plurality of first differentiation means comprises a logic OR circuit.

9. An apparatus according to claim 7, wherein said means for generating a forward voltage detection signal comprises a SET-RESET flip-flop circuit, and wherein the means for logically combining is coupled to said flip-flop circuit to provide a SET signal to the flip-flop circuit when the logical combining means provides an output indicating the presence of a forward voltage being applied to the thyristors based on the combination of outputs of the first differentiation means to generate the first voltage detection signal.

10. An apparatus according to claim 9, further comprising means for resetting the flip-flop circuit upon determining that forward voltage has ceased to be applied to the thyristors or upon determining that a trigger pulse has been generated for a predetermined time interval.

11. An apparatus according to claim 10, wherein said means for resetting the flip-flop circuit includes a plurality of second differentiation means coupled to receive output signals of said voltage detectors through a plurality of corresponding converters to provide an indication of an end of the application of forward voltage to said thyristors.

* * * * *